(12) United States Patent
Frantz et al.

(10) Patent No.: US 11,337,554 B1
(45) Date of Patent: May 24, 2022

(54) APPARATUS FOR ACCELERATING HEAT TRANSFER ON FLAT GRIDDLES AND METHODS FOR USING SUCH APPARATUS

(71) Applicant: IN-N-OUT BURGERS CORPORATION, Irvine, CA (US)

(72) Inventors: Howard Frantz, Irvine, CA (US); Mark Courtney, Chino Hills, CA (US)

(73) Assignee: IN-N-OUT BURGERS CORPORATION, Irvine, CA (US)

( * ) Notice: Subject to any disclaimer, the term of this patent is extended or adjusted under 35 U.S.C. 154(b) by 343 days.

(21) Appl. No.: 16/557,903

(22) Filed: Aug. 30, 2019

Related U.S. Application Data

(60) Provisional application No. 62/724,963, filed on Aug. 30, 2018.

(51) Int. Cl.
*A47J 37/06* (2006.01)
*A47J 37/08* (2006.01)
*A47J 27/00* (2006.01)

(52) U.S. Cl.
CPC ......... *A47J 37/0857* (2013.01); *A47J 27/002* (2013.01); *A47J 37/067* (2013.01); *A47J 37/0864* (2013.01)

(58) Field of Classification Search
CPC ........... A47J 27/002; A47J 27/04; A47J 43/20
USPC ......... 99/349, 350, 351, 353, 422, 423, 424, 99/426, 439, 445, 446, 447, 448, 449
See application file for complete search history.

(56) References Cited

U.S. PATENT DOCUMENTS

| | | | |
|---|---|---|---|
| 4,241,650 A * | 12/1980 | John | A47J 37/06 99/349 |
| 5,197,377 A | 3/1993 | Jennings et al. | |
| 6,736,051 B2 | 5/2004 | Frantz et al. | |
| 9,930,726 B2 * | 3/2018 | Maruyama | H05B 3/023 |
| 10,154,761 B2 | 12/2018 | Seitz | |
| 2010/0326982 A1 * | 12/2010 | Yamada | A23L 3/10 219/538 |

* cited by examiner

*Primary Examiner* — Hung D Nguyen
(74) *Attorney, Agent, or Firm* — William A. English; Vista IP Law Group LLP

(57) ABSTRACT

Toasting apparatus for preparing food products, e.g., buns, are provided for a griddle including a flat griddle surface onto which food products may be placed for cooking, as well as methods for using such apparatus. The apparatus includes a rigid frame movable between a raised position to place food products on or remove food products from the griddle surface and a lowered position wherein a lower surface of the frame is positioned above the griddle surface. The frame includes a plurality of flexible members, e.g., elongate strips, including intermediate regions extending from the lower surface to contact food products on the griddle surface such that the flexible members conform to shapes of food products placed on the griddle surface when the frame is placed in the lowered position to apply pressure to the food products.

20 Claims, 4 Drawing Sheets

US 11,337,554 B1

APPARATUS FOR ACCELERATING HEAT TRANSFER ON FLAT GRIDDLES AND METHODS FOR USING SUCH APPARATUS

RELATED APPLICATION DATA

The present application claims benefit of U.S. provisional application Ser. No. 62/724,963, filed Sep. 1, 2018, the entire disclosure of which is expressly incorporated by reference herein.

FIELD OF THE INVENTION

The present invention relates generally to apparatus for food preparation and, more particularly, to toasting apparatus for improving heat transfer on griddles or other cooking apparatus, e.g., for accelerating and/or otherwise improving heat transfer to buns or other food products being prepared on a flat griddle, and to methods for using such apparatus.

BACKGROUND

Many believe that toasting buns on a flat top griddle provides a better toast quality than other toasting techniques. However, it can take as much as five minutes to get a deep, quality toast on a flat top griddle. This does not align with the speed requirements of many food service operations.

It is well known to those skilled in the art that the toasting process can be accelerated by adding a small amount of weight to the top of the bun. This enhances direct contact with the griddle, which increases the rate of conductive heat transfer to the bun. Over the years, cooks have improvised many "backyard" ways of adding weight to the bun. While some have been effective at improving toast quality, most would not meet health department standards or be considered labor efficient.

An example of a clamshell griddle toasting appliance that was commercial grade and approved by the National Sanitation Foundation ("NSF") is disclosed in U.S. Pat. No. 6,736,051 to Frantz and Boyer, the entire disclosure of which is expressly incorporated by reference herein. This apparatus is effective for obtaining consistent toast quality on multiple buns in a labor efficient manner. However, the Frantz et al. toaster may be costly and difficult to clean. In particular, cleanliness is paramount in a food service environment. The individual floating pins in the Frantz et al. toaster may be difficult to thoroughly clean and sanitize; eventually this can lead to deposits falling onto the buns being toasted. In addition, the floating pins may be subject to damage during handling. Once bent, they are difficult to repair and/or replace in the field.

Another cover for a toasting apparatus is disclosed in U.S. Publication No. 2016/0029845 to Seitz, the entire disclosure of which is expressly incorporated by reference herein. The Seitz cover includes a sheet of chainmail attached to a hinged frame to apply pressure to accelerate bun toasting. While the Seitz cover may address some of the issues of earlier toasters, it may introduce new issues. For example, if there is too much slack in the chainmail, the cover may sag onto the griddle surface when there are no buns or a small batch of buns on the griddle. Such contact with the griddle surface is undesirable for multiple reasons. First, it is common for atomized grease to deposit on the griddle surface throughout the day. Such grease may be easily picked up by the chainmail sheet, which can then be transferred to the tops of toasted buns. This can create undesirable marks on the buns themselves and/or otherwise potentially contaminate the food products being prepared. In addition, direct contact with a four hundred degree Fahrenheit (200° C.) plus griddle surface may cause the chainmail itself to get very hot which can also have an undesired impact on toast quality. Further, if the chainmail sheet is pulled taught enough to not sag onto the griddle surface, it may not adequately conform to the shape of the buns, thus causing them to deform and have uneven application of pressure.

Finally, the chainmail of the Seitz cover includes many small interlocked rings. The commercial food service environment tends to be harsh on equipment. As these rings become worn or damaged enough to break off, they may present a serious food safety risk. It is generally considered good practice that anything that sits above food should be large enough so that, if it falls onto the food item, it is obvious enough to be visually detected (by either the employee or the customer) before it is consumed.

Therefore, apparatus and methods for accelerating and/or improving heat transfer to food products prepared on a griddle or other cooking apparatus would be useful.

SUMMARY

The present invention is directed to apparatus for food preparation and, more particularly, to toasting apparatus for improving heat transfer on griddles or other cooking apparatus, e.g., for accelerating and/or otherwise improving heat transfer to buns or other food products being prepared on a flat griddle, and to methods for using such apparatus.

In one example, a toasting apparatus is provided that includes a cover including a plurality of independent flexible members that may apply desired pressure on each bun regardless of the number of buns being toasted to accelerate and/or improve toasting. In addition, the flexible members may be configured such that they do not directly contact the griddle surface, thus reducing any heat/grease transfer concerns. In addition, the cover may not include tiny pieces that may potentially get into the food products being prepared.

In accordance with an exemplary embodiment, a toasting apparatus is provided for a griddle for preparing food products that includes a rigid frame including a first end, a second end, a length between the first and second ends, and a lower surface along the length for positioning above a griddle surface of a griddle. A plurality of flexible members on the frame may be spaced apart from one another along the length, each flexible member including opposite ends fixed to the frame and an intermediate region between the opposite ends suspended or otherwise extending from the lower surface to contact food products on a griddle surface of the griddle. The flexible members may be formed from material configured to conform to shapes of food products placed on the griddle surface when the frame is placed above the griddle surface and apply pressure to the food products.

In accordance with another embodiment, a cooking apparatus is provided for preparing food products that includes a cooking surface, e.g., a flat griddle surface, onto which food products may be placed for cooking, and a cover. The cover may include a rigid frame movable between a raised position to place food products on or remove food products from the cooking surface and a lowered position where a lower surface of the frame is positioned above the cooking surface, the frame including a first end, a second end, and a length between the first and second ends; and a plurality of flexible members on the frame and spaced apart from one another along the length, each flexible member including opposite ends fixed to the frame and an intermediate region between the opposite ends suspended or otherwise extending from the lower surface to contact food products on a cooking surface. The flexible members may be formed from material configured to conform to shapes of food products placed on the cooking surface when the frame is placed in the lowered position, e.g., to apply pressure to the food products.

In accordance with still another embodiment, a method is provided for preparing food products that includes placing one or more food products on a cooking surface of a cooking apparatus, e.g., a flat griddle surface of a griddle, and placing a cover in a lowered position above the cooking surface, the cover including a rigid frame and a plurality of flexible members on the frame and spaced apart from one another such that intermediate regions of the flexible members conform to shapes of the food products to apply pressure to the food products.

Other aspects and features including the need for and use of the present invention will become apparent from consideration of the following description taken in conjunction with the accompanying drawings.

BRIEF DESCRIPTION OF THE DRAWINGS

The invention is best understood from the following detailed description when read in conjunction with the accompanying drawings. It is emphasized that, according to common practice, the various features and design elements of the drawings are not to-scale. On the contrary, the dimensions of the various features and design elements are arbitrarily expanded or reduced for clarity. Included in the drawings are the following figures.

As shown in FIG. 5, the flexible members may conform to the shape of the buns while providing desired pressure to accelerate or otherwise improve toasting.

DETAILED DESCRIPTION OF THE EXEMPLARY EMBODIMENTS

Before the exemplary embodiments are described, it is to be understood that the invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials are now described.

It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Figure 1:
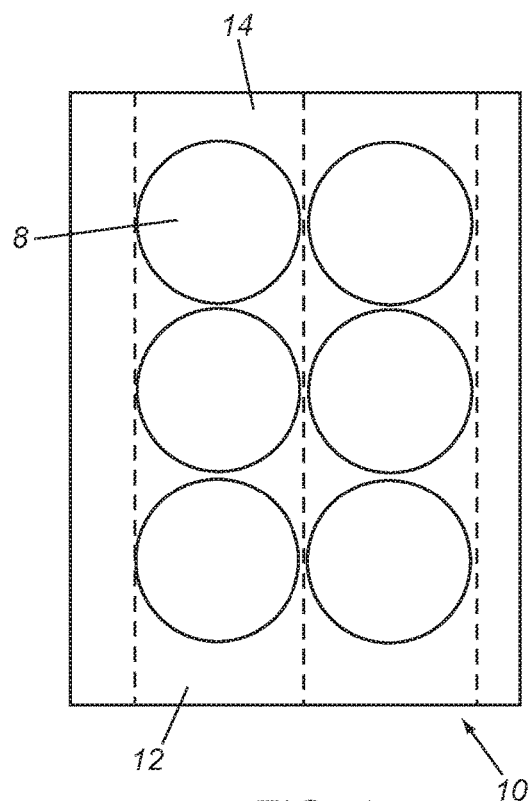
FIG. 1 is a top view of an exemplary griddle surface of a griddle that includes two lanes having a plurality of buns placed thereon for toasting.
Figure 2:
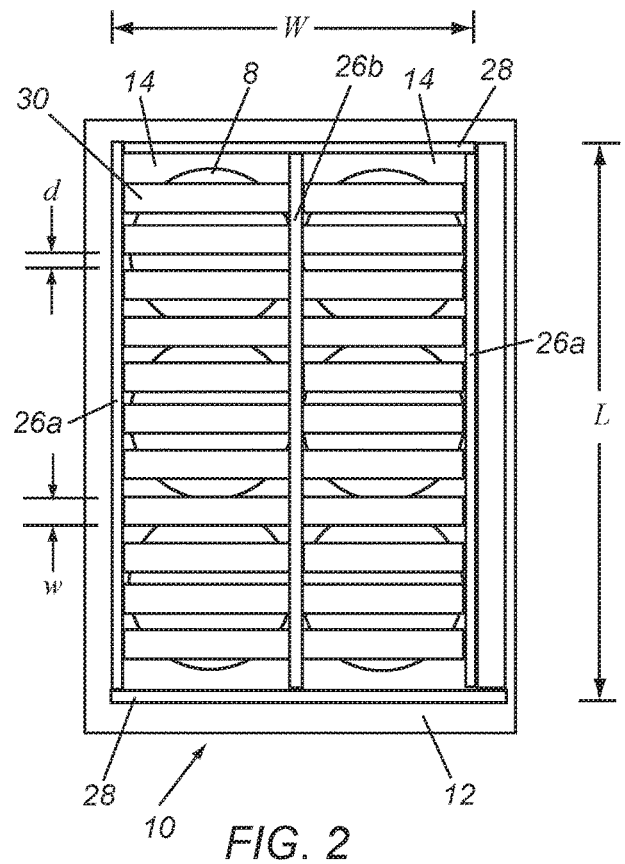
FIG. 2 is a top view of the griddle of FIG. 1 with a toasting apparatus positioned above the buns that includes a plurality of independent flexible members to apply pressure against the buns being toasted.
Figure 3:
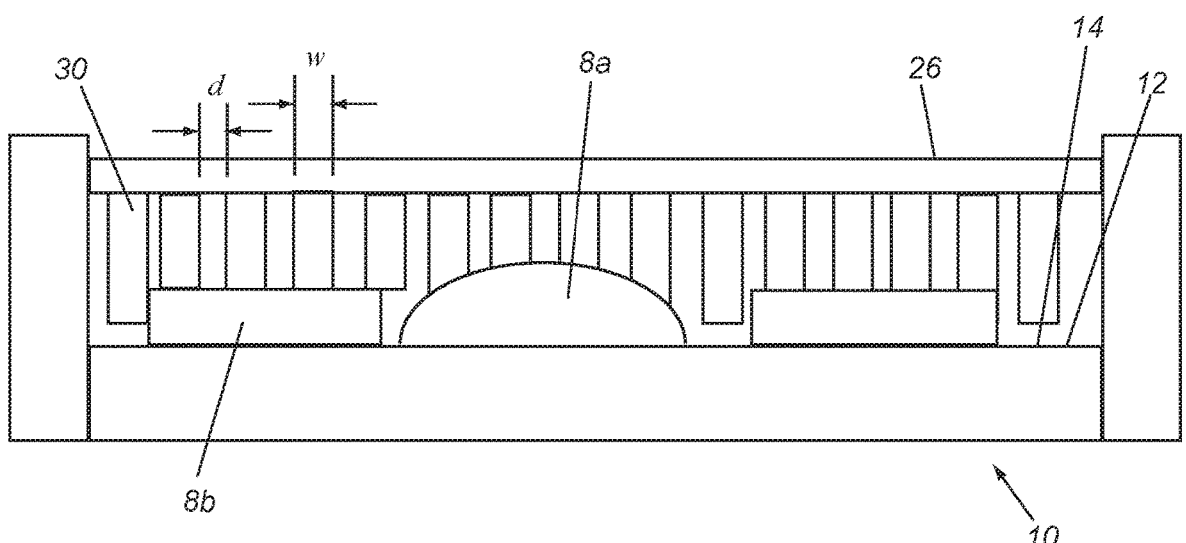
FIG. 3 is a side view of the toasting apparatus of FIG. 2 in a lowered position showing the flexible members applying pressure to the buns without contacting the griddle surface.

Turning to the drawings, FIGS. 1-5 show an example of a flat griddle 10 including a griddle surface 12 onto which food products may be placed for cooking, e.g., buns 8 placed in two (or optionally more) lanes or rows 14 for toasting as shown in FIG. 1, and a cover or toasting apparatus 20, as shown in FIGS. 2 and 3, which may include any of the embodiments described herein. The griddle 10 may include one or more conventional components, e.g., one or more heating elements beneath the griddle surface 12, sidewalls, troughs, and the like (not shown), similar to conventional griddles or other cooking apparatus, such as the griddles disclosed in the references incorporated by reference elsewhere herein.

Figure 4:
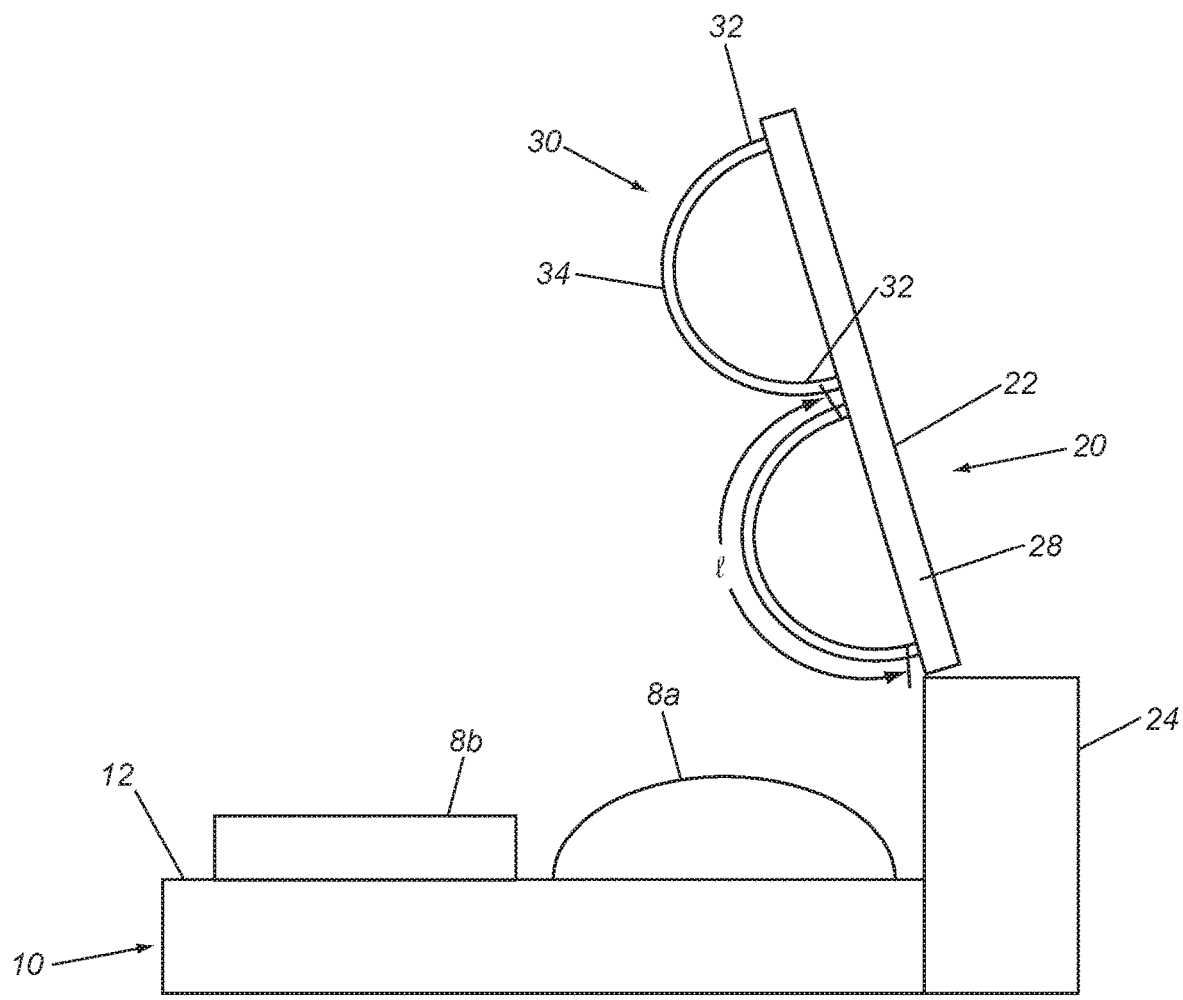
FIGS. 4 and 5 are front views of the toasting apparatus of FIG. 2 in raised and lowered positions, respectively.
Figure 5:
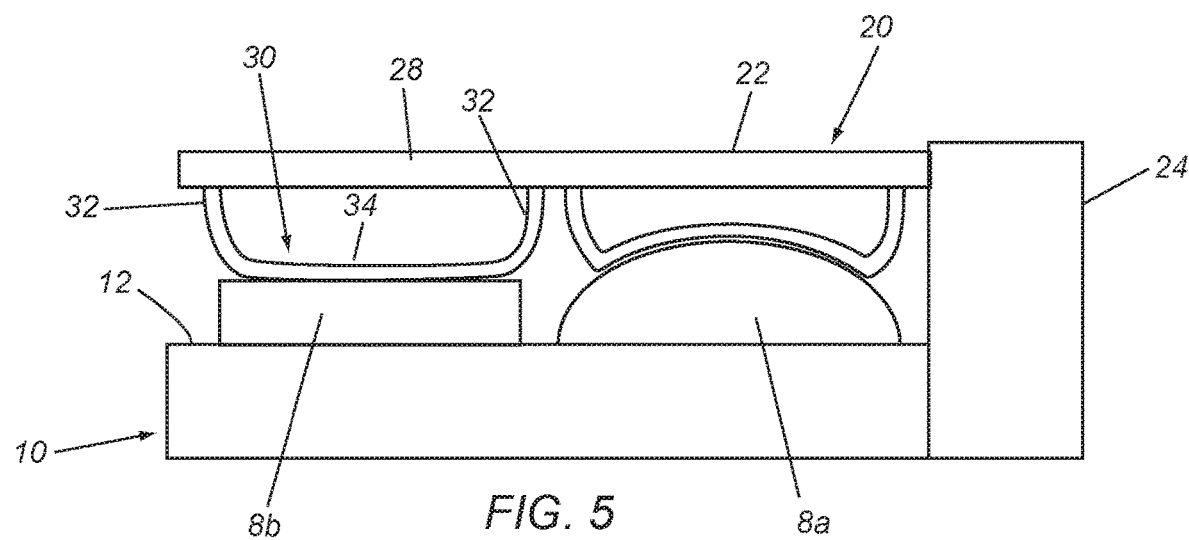

Generally, the toasting apparatus 20 includes a rigid frame 22 carrying a plurality of flexible members 30, which is movable between a raised position to provide access to the griddle surface 12, e.g., to place food products on or remove food products from the griddle surface 12, e.g., as shown in FIG. 4, and a lowered position where the frame 22 is positioned above the griddle surface 12 and the flexible members 30 apply pressure to the food products 8 to improve cooking, e.g., as shown in FIG. 5 and described further elsewhere herein. For example, the griddle 10 may include one or more supports or mounts 24 fixedly attached or coupled to the griddle 10, e.g., along one side or back of the griddle surface 12, and the frame 22 may be movably coupled to the supports 24, e.g., by one or more hinges (not shown), e.g., a "clamshell" hinge mechanism, such that the apparatus 20 moves along a curved path between the raised and lowered positions, as indicated in FIG. 4. The mounts 24 may limit movement of the frame 22, e.g., to position the frame 22 a predetermined distance above the griddle surface 12 in the lowered position. In addition or alternatively, one or more shims or stops (not shown) may be provided on the griddle 10, e.g., on the side opposite the mounts 24, to limit the frame 22 moving below the lowered position. In another alternative, one or more stops (also not shown) may extend from the frame 22, e.g., on the side opposite the mounts 24, that contact the griddle 10 when the apparatus 20 is moved to the lowered position to maintain the desired minimal distance.

It will be appreciated that other mounting mechanisms may be provided that allow the apparatus 20 to be moved out of the way to allow a user to add and remove food products during food preparation, e.g., along a curved and/or substantially straight path, and then position the apparatus 20 a desired distance above the griddle surface 12 in the lowered position such that the flexible members 30 contact and apply pressure to the food products 8. Optionally, a powered positioning mechanism may be provided (not shown) that may be coupled to the apparatus 20 to direct the apparatus between the raised and lowered positions, e.g., when activated. For example, an electro-mechanical, pneumatic, hydraulic, or other mechanism may be provided instead of a manually lifted and lowered apparatus 20.

In a further alternative, the apparatus 20 may be separate from the griddle 10 such that the apparatus 20 may be removed entirely when desired, yet positioned above the griddle surface 12, e.g., by placing the frame 22 on a plurality of stops or mounts (not shown) on the griddle 10 adjacent the griddle surface 12 to position the apparatus 20 above the griddle surface 12 at a desired distance. In yet another alternative, the toasting apparatus 20 may be mounted to another structure adjacent the griddle 10 such that the apparatus 20 extends over the griddle surface 12 and may be moved between raised and lowered positions, as desired.

As best seen in FIG. 2, the frame 22 may include a plurality of side rails 26 spaced apart from one another across a width "W" of the frame 22, e.g., outer side rails 26a and central side rail 26b, extending substantially parallel to one another along a length "L" of the frame 22. Ends of the side rails 26 may be coupled to end rails 28 to provide a rigid structure capable of supporting the flexible members 30 and moving between the raised and lowered positions. In the embodiment shown, the side rails are aligned with the lanes 14 of the griddle surface 12, e.g., with the outer rails 26a aligned adjacent outer edges of the two lanes 14 shown and the central side rail 26b aligned between the lanes 14 to provide a lane divider. Alternatively, it will be appreciated that only two side rails may be provided or more than three side rails may be provided (not shown), as desired to support the frame 22 and flexible members 30. Further alternatively, other cross rails or other members may be coupled to the ends and/or intermediate locations of the side rails, e.g., instead of or in addition to the cross rails 28, as desired to provide a rigid frame.

As best seen in FIGS. 2 and 3, the flexible members 30 may be mounted in one or more rows along the length L of the frame 22. For example, as shown, two rows of flexible members 30 may be provided such that each row is positioned above a respective lane 14 of the griddle surface 12, and the flexible members 30 extend orthogonally relative to the length L of the frame 22. It will be appreciated that the flexible members may be provided in a single row or more than two rows on the frame (not shown), as desired, based on the configuration of the cooking surface over which the toasting apparatus is used.

With additional reference to FIGS. 4 and 5, each flexible member 30 may be an elongate strip or segment of flexible material including opposite ends 32 attached or otherwise coupled to the frame 22, and an intermediate region 34 extending between the opposite ends 32 such that the intermediate region 34 extends from a lower surface of the frame 22, e.g., to contact food products 8a, 8b on the griddle surface 12, as shown in FIG. 5. The flexible members 30 may be formed from flexible material configured to conform to shapes of food products 8a, 8b placed on the griddle surface 12 when the frame 22 is placed in the lowered position, e.g., to apply pressure to the food products without deforming the food products themselves.

For example, each flexible member 30 may be formed separately, e.g., by cutting strips from a larger sheet of material, by die-cutting from a sheet, molding, casting, 3-D printing, and the like, and then attached to the frame 22. For example, the opposite ends 32 of the flexible members 30 may be permanently attached to the side rails 26 of the frame, e.g., by one or more of bonding with adhesive, fusing, fasteners, interference fit, and the like such that the intermediate regions 34 suspend from and between the side rails 26, as described elsewhere herein.

The flexible members 30 may be spaced apart from one another by a distance "$d$" aligned along the length "L" of the frame 22 such that the flexible members 30 are free to move independently of one another, e.g., free to deform or otherwise move separately from one another. It will be appreciated that the flexible members 30 may be arranged in other configurations on the frame 22 depending upon the configuration of the griddle surface 12 and/or the size and/or shape of the food products being prepared. In addition, each flexible member 30 has a predetermined arc length "$\ell$" between the opposite ends 32 selected to prevent the intermediate region 34 from contacting the griddle surface when the frame 22 is in the lowered position and no food products are on the griddle surface 12. In an exemplary embodiment, the width "$w$" of the flexible members (parallel to the length L of the frame 22) may be about 0.75 inch (19 mm) and the distance "$d$" between adjacent flexible members 30 may be about 0.25 inch (6 mm).

Given the independent nature of the flexible members 30, individual flexible members may deform differently to conform to the overall shape of individual food products on the griddle surface 12 contacted by a subset of the flexible members 30. For example, as shown in FIG. 5, the flexible members 30 may be sufficiently flexible to suspend freely from the frame 22 and conform to a plurality of hamburger buns, e.g., including both a crown 8a, e.g., having a convex shape, and a heel 8b, e.g., having a substantially uniform flat shape, while providing substantially uniform pressure to accelerate toasting, as described further elsewhere herein.

In one embodiment, the pressure applied by the flexible members 30 may be substantially uniform. Alternatively, the mechanical properties and/or size and shape of the flexible members 30 may be different at different locations on the frame 22. In a further embodiment, the flexible members 30 may have varying densities and/or weight distributions within each flexible member 30 or among the flexible members 30. For example, some cooking surfaces may have different temperatures at different locations, e.g., at the front or back of the griddle surface 12, e.g., due to the arrangement of gas or electric heating elements under or adjacent the griddle surface. Different pressures may be applied at hotter and/or cooler regions of the griddle surface 12 to reduce the risk of over-toasting food products at hotter regions of the griddle surface 12. For example, some gas griddles may be 50-60 degrees (10-15° C.) cooler at the front of the griddle surface than at the back closer to the flue. In such griddles, providing increased pressure at the front may result in buns toasting at the same rate over the entire griddle surface even though the front is cooler than the back of the griddle surface. Similarly, electric griddles may have hotter regions immediately adjacent heating elements and the flexible members may be configured differently from one another relative to such regions, e.g., to decrease pressure on hotter regions and increase pressure on cooler regions, e.g., to enhance more even toasting on such griddles.

The contact surfaces of the flexible members 30, i.e., that contact food products on the griddle surface 12, may be substantially smooth and/or convex to minimize deformation of the food products being prepared. Alternatively, the contact surfaces may be textured and/or include other features, e.g., to prevent the food products from sliding or otherwise moving once contacted by the flexible members 30. In addition or alternatively, textured surfaces may be provided on the contact surfaces to facilitate vapor, gases, grease, and the like from the food products escaping during preparation.

Figure 6:
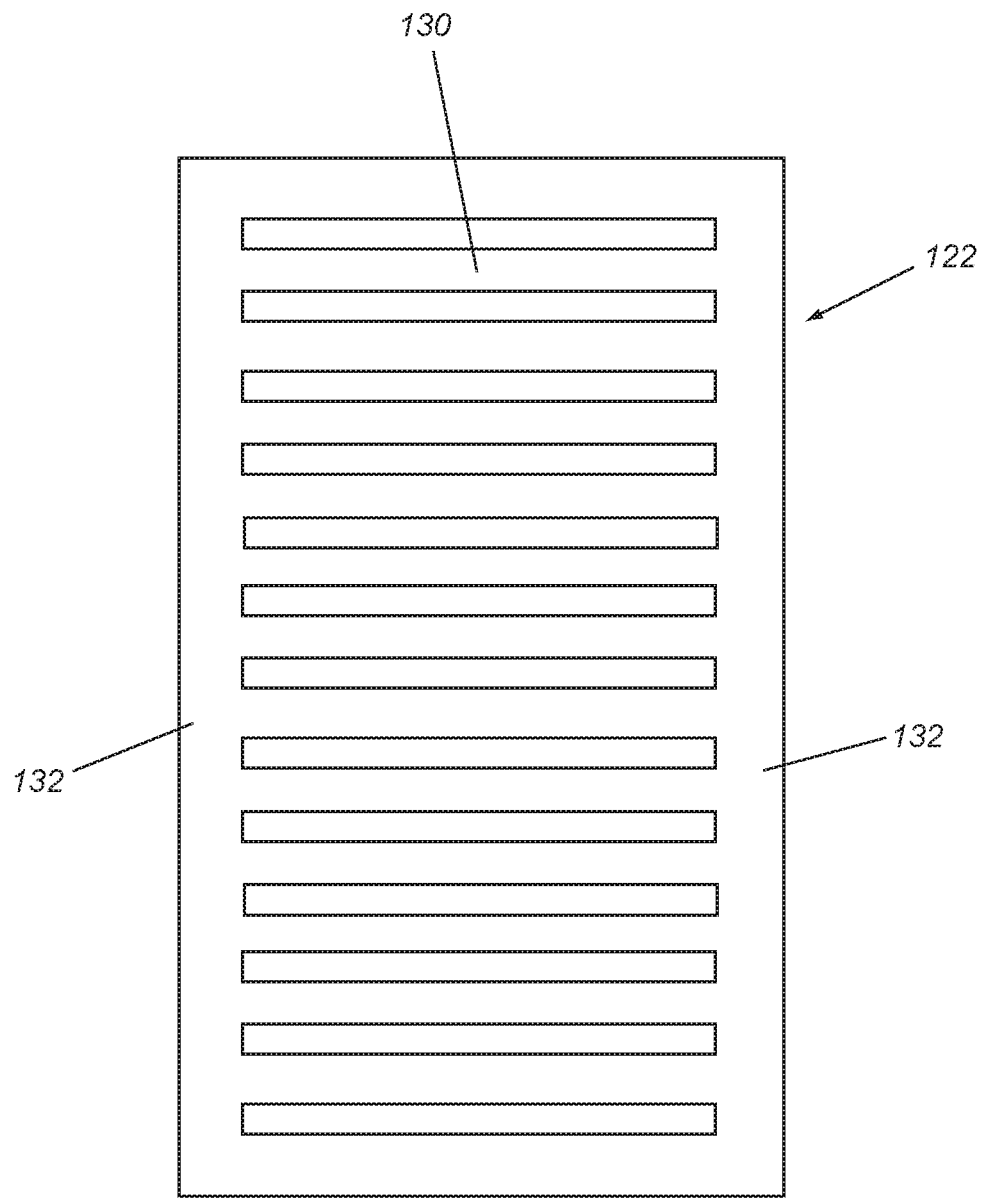
FIG. 6 is a top view of another exemplary embodiment of a cover including a plurality of flexible members formed from an integral sheet having the flexible members formed directly therein.

In another embodiment, shown in FIG. 6, instead of providing a plurality of separate strips or segments, a sheet of material 122 may be provided that includes a plurality of flexible members 130 formed integrally from the sheet 122, e.g., molded, cast, machined, laser cut from a formed sheet, and the like, such that individual flexible members 130 extend between sides 132 of the sheet 122. Once formed, the sheet 122 may be mounted to a frame (not shown), such that the flexible members 130 are suspended or otherwise extend from the frame in a desired manner to apply pressure to food products, similar to other embodiments herein.

In an exemplary embodiment, the flexible members 30, or the sheet 122 and flexible members 130, may be partially or substantially formed of silicone, e.g., high-temperature silicone that may durable (e.g., to handle extended exposure to the heat from the griddle 10 without deteriorating), cleanable, and/or relatively inexpensive. For example, silicone materials are available that may provide desired durability, cleanability, and/or cost, that are relatively lightweight and provide a spring-like compression when lowered onto food products. Alternatively, the flexible members 30 may be formed from other materials, such as PTFE, which may be formed into strips or segments to provide individual flexible members 30.

It will be appreciated that the flexible members 30 may be formed from other flexible materials that are considered food-safe to at least four hundred degree Fahrenheit (200° C.). Generally, the flexible members 30 should be constrained in two dimensions, e.g., fixed at the opposite ends 32 while the intermediate regions 34 are free to move upwardly or downwardly to conform to the shape of the contacted food products. In addition, it may be desirable that motion of the flexible members 30 be limited in a direction parallel to the length L of the frame 22, e.g., to prevent the flexible members 30 from deflecting laterally when placed against irregularly shaped food products. For example, the width "$w$" of the flexible members 30 (parallel to the length L of the frame 22) may be substantially greater than their thickness and/or the spacing distance "$d$".

Optionally, the flexible members 30 shown in FIGS. 2-5 (or other embodiments herein) may include reinforcement elements (not shown), e.g., embedded within the silicone or other material, to limit lateral movement and/or otherwise limit the conformability of the flexible members 30 other than in a vertical direction relative to the griddle surface 12. The reinforcement members may also provide desired spring constant to the flexible members 30, e.g., to provide a desired pressure against food products being cooked.

Figure 7:
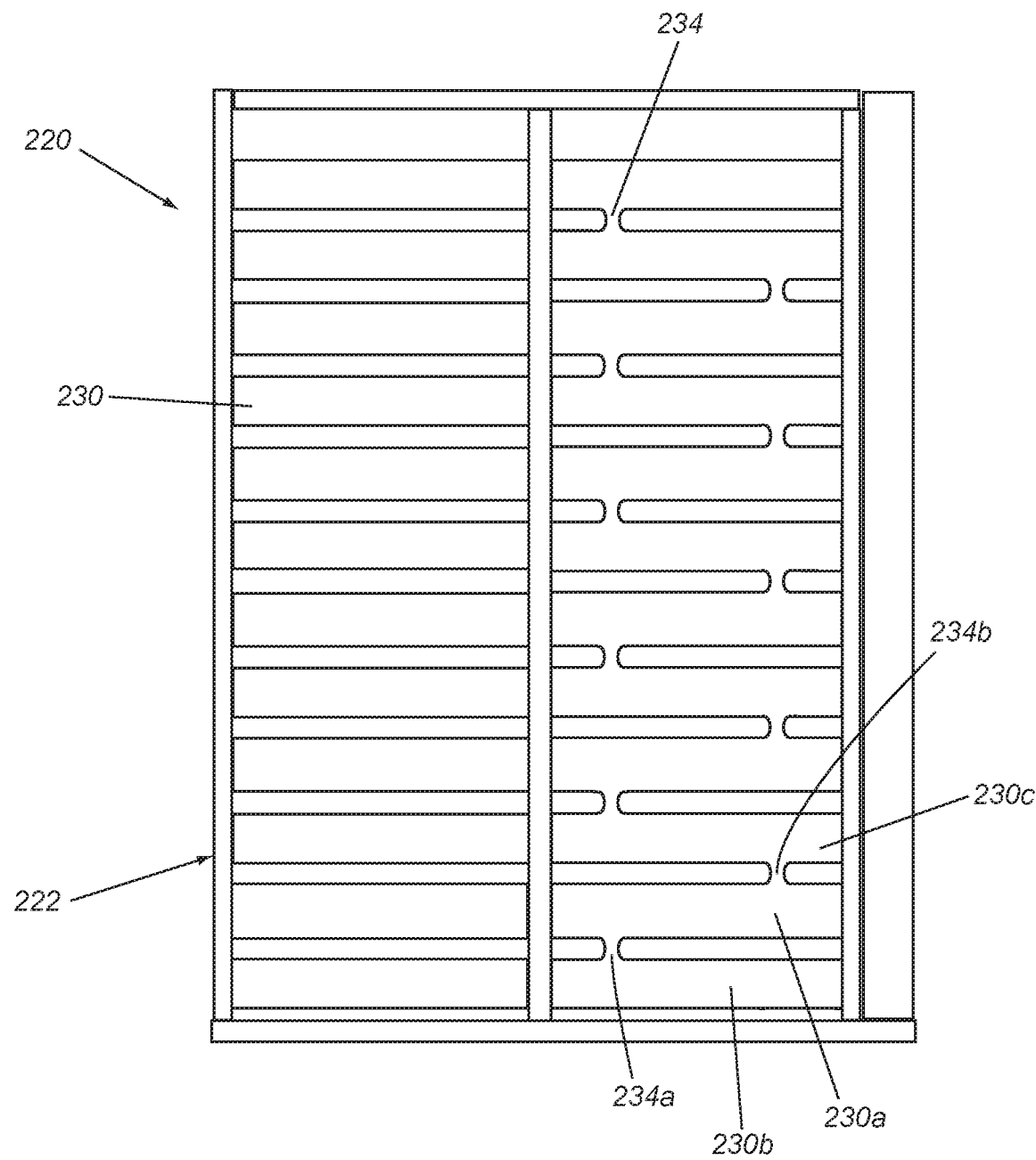
FIG. 7 is a top view of an alternative embodiment of a toasting apparatus including a plurality of flexible members mounted to a frame and a plurality of stabilizing elements or supports extending between adjacent flexible members.

Optionally, if desired one or more stabilizing elements or intermediary supports may be provided, e.g., coupled or otherwise extending between adjacent flexible members to support and promote positioning of the flexible members, e.g., to minimize variability in positioning between adjacent flexible members. For example, FIG. 7 shows an exemplary embodiment of a cover or toasting apparatus 220 that includes a plurality of flexible members 230 mounted on a frame 222, generally similar to other embodiments herein. In addition, one or more supports 234 may extend between adjacent flexible members 230, e.g., to limit lateral motion of the flexible members 230. In the embodiment shown, a single support 234 extends between each adjacent pair of flexible members 230, although alternatively a plurality of supports may be provided between adjacent flexible members, if desired (not shown). In another alternative, supports may be provided between every other flexible member or in another intermittent arrangement, if desired, e.g., which may increase lateral flexibility.

Optionally, as shown in FIG. 7, the supports 234 may be staggered relative to one another along the row of flexible members 230. For example, intermediate flexible member 230a may include a first support 234a closer to a first end of the flexible member 230a connecting to a first adjacent flexible member 230b (i.e., extending from a first side of the flexible member 230) and a second support 234b closer to a second opposite end coupled to a second adjacent flexible member 230c (i.e., extending from a second side of the intermediate flexible member 230a). Alternatively, the supports may be aligned axially with one another along the row of flexible members (not shown).

In one embodiment, the intermediary supports 234 may be integrally formed as part of the flexible members 230, e.g., by cutting or otherwise forming the flexible members 230 and supports 234 from a single sheet of material, similar to the sheet 122 shown in FIG. 6, to provide a singular framework that may be attached to the frame 222. Alternatively, a single support may be formed integrally with a single flexible member and then a free end of the support may be attached to the adjacent flexible member, e.g., by one or more of bonding with adhesive, sonic welding, fusing, and the like.

In another alternative, the supports 234 may be formed separately from the flexible members 230 and both ends of the supports 234 may be attached between adjacent flexible members 230, e.g., by one or more of bonding with adhesive, sonic welding, fusing, and the like. In this alternative, the supports 234 may be formed from different material than the flexible members 230, e.g., having different mechanical properties. For example, the supports may have a higher elasticity than the flexible members to allow the flexible members 230 to deflect easily when the apparatus 220 is lowered and the flexible members 230 are placed against food products while resiliently enhancing the flexible members 230 returning to their original, neutral shape and orientation when the apparatus 220 is raised away from the food products.

In further alternatives, the flexible members 30 may be formed from materials such that the weight of the material may apply desired pressure to food products against which they are applied, e.g., in addition to or instead of an elastic force from the material. For example, in one embodiment, each flexible member 30 may be formed from a plurality of rigid links coupled together at hinges and extending between the opposite ends of the flexible member 30, e.g., similar to a bicycle chain. Such links may be formed from stainless steel (e.g., type 304) or other food-safe material having sufficient weight to apply pressure to the food products yet deflect along the length of the flexible member 30 to conform to the shape of the good product being prepared.

In another embodiment, each flexible member 30 may formed from a segment of chainmail extending between the opposite ends of the flexible member 30 again formed from stainless steel or other food-safe material having sufficient weight to apply pressure to the food products yet deflect along the length of the flexible member 30 to conform to the shape of the good product being prepared.

In yet another embodiment, each flexible member 30 may be formed from a plurality of flexible links or elements coupled together along a length of the flexible member 30 between the opposite ends, e.g., similar to a conveyor belt. Such elements may have widths that are substantially greater than their thicknesses to apply pressure due to their weight while limiting lateral movement.

In still another embodiment, the flexible members 30 may include a plurality of flexible domes mounted to the frame in a predetermined arrangement such that the individual domes may compress or otherwise deform when placed against food products, yet apply sufficient pressure to accelerate toasting and/or otherwise improve cooking, similar to other embodiments herein.

Returning to FIGS. 4 and 5, during use, the toasting apparatus 20 may be directed to the raised position, e.g., shown in FIG. 4, and buns 8a, 8b may be placed on the griddle surface 12, e.g., in a plurality of lanes or rows 14, as shown in FIG. 1. The apparatus 20 may be directed to the lowered position, e.g., shown in FIG. 5, thereby applying pressure to the buns 8 to accelerate heat transfer and/or otherwise improve toasting of the buns 8a, 8b. The flexible members 30 may conform to the shape of the buns 8a, 8b, yet apply pressure to provide more uniform pressure and/or toasting, to accelerate the toasting time, and/or otherwise improve the toasting process. Once sufficient time has passed, the apparatus 20 may be directed back to the raised position, and the toasted buns 8a, 8b may be removed and incorporated into finished food products.

Although described with particular reference to cooking apparatus for toasting buns, e.g., for hamburgers, it will be appreciated that the toasting apparatus and methods described herein may be applicable to a variety of food products. For example, the apparatus may be used to accelerate toasting in different bread products, e.g., English muffins, bagels, French rolls, and the like. In addition, the apparatus described herein may also be used with other cooking apparatus, e.g., grated grills rather than grills having a continuous flat surface. Alternatively, cooking proteins, e.g., hot dogs, chicken or beef patties, sausages, or whole pieces of meat, may be cooked using the apparatus described herein to apply pressure, which may accelerate and/or otherwise improve cooking such food products.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

We claim:

1. A toasting apparatus for a flat griddle for preparing food products, comprising:
    a rigid frame comprising a first end, a second end, a length between the first and second ends, and a lower surface along the length for positioning above a griddle surface of a flat griddle; and
    a plurality of flexible members on the frame and spaced apart from one another along the length, each flexible member comprising opposite ends fixed to the frame and an intermediate region between the opposite ends extending from the lower surface to contact food products on the griddle surface, the flexible members formed from material configured to conform to shapes of food products placed on the griddle surface when the frame is placed above the griddle surface and apply pressure to the food products,
    wherein each flexible member comprises a strip including opposite ends fixed to the frame and a curved intermediate region extending between the opposite ends.

2. The apparatus of claim 1, wherein each flexible member has a width extending between the opposite ends, and wherein adjacent flexible members are spaced apart from one another by a spacing distance.

3. The apparatus of claim 2, wherein the spacing distance is less than the width.

4. The apparatus of claim 1, wherein each flexible member comprises a length between the opposite ends extending orthogonal to the length of the frame and a width oriented parallel to the length of the frame.

5. The apparatus of claim 1, wherein the frame comprises first and second side rails spaced apart from one another across a width of the frame and extending substantially parallel to the length, and wherein the flexible members comprise opposite ends fixed to the first and second side rails such that the intermediate regions extend between the first and second side rails orthogonal to the length.

6. The apparatus of claim 1, wherein the frame comprises first, second, and third side rails spaced apart from one another across a width of the frame and extending substantially parallel to the length, wherein the flexible members comprise a first row of flexible members including opposite ends fixed to the first and second side rails such that the intermediate regions of the first row of flexible members extend between the first and second side rails, and a second row of flexible members including opposite ends fixed to the second and third side rails such that the intermediate regions of the second row of flexible members extend between the second and third side rails.

7. The apparatus of claim 1, wherein the flexible members are formed from PTFE.

8. The apparatus of claim 1, wherein the flexible members are integrally formed from a single sheet of material, the sheet mounted to side rails of the frame.

9. The apparatus of claim 1, further comprising one or more supports coupled between adjacent flexible members.

10. The apparatus of claim 9, wherein a support is coupled between each adjacent pair of flexible members to limit lateral motion of the flexible members.

11. The apparatus of claim 10, wherein the flexible members comprise first and second end flexible members adjacent the first and second ends of the frame, respectively, and intermediate flexible members spaced apart from one another in a row between the first and second end flexible members, and wherein the supports are staggered such that each intermediate flexible member includes a first support closer to a first of its opposite ends coupled to an adjacent flexible member on a first side of the intermediate flexible member and a second support closer to a second of its opposite ends coupled to another adjacent flexible member on a second side of the intermediate flexible member.

12. The apparatus of claim 9, wherein the supports are integrally formed with the material of the flexible members.

13. The apparatus of claim 9, wherein the supports are permanently attached to the flexible members.

14. A toasting apparatus for a flat griddle for preparing food products, comprising:

a rigid frame comprising a first end, a second end, a length between the first and second ends, and a lower surface along the length for positioning above a griddle surface of a flat griddle; and a plurality of flexible members on the frame and spaced apart from one another along the length, each flexible member comprising opposite ends fixed to the frame and an intermediate region between the opposite ends extending from the lower surface to contact food products on the griddle surface, the flexible members formed from material configured to conform to shapes of food products placed on the griddle surface when the frame is placed above the griddle surface and apply pressure to the food products, wherein the flexible members are formed from silicone.

15. A cooking apparatus for preparing food products, comprising:

a griddle comprising a flat griddle surface onto which food products may be placed for cooking; and a cover comprising:

a rigid frame movable between a raised position to place food products on or remove food products from the griddle surface and a lowered position wherein a lower surface of the frame is positioned above the griddle surface, the frame comprising a first end, a second end, and a length between the first and second ends; and a plurality of flexible members on the frame and spaced apart from one another along the length, each flexible member comprising opposite ends fixed to the frame and an intermediate region between the opposite ends extending from the lower surface to contact food products on the griddle surface, the flexible members formed from material configured to conform to shapes of food products placed on the griddle surface when the frame is placed in the lowered position to apply pressure to the food products, wherein each flexible member comprises a strip including opposite ends fixed to the frame and a curved intermediate region extending between the opposite ends.

16. The apparatus of claim 15, wherein the griddle surface comprises a lane along which a plurality of food products may be placed in a row, and wherein the flexible members are arranged in a row such that the row of flexible members is located above the lane in the lowered position to apply pressure to the food products placed in the lane.

17. The apparatus of claim 15, wherein the griddle surface comprises a plurality of lanes along which a plurality of food products may be placed in rows, and wherein the flexible members are arranged in a plurality of rows such that the rows of flexible members are located above respective lanes in the lowered position to simultaneously apply pressure to the food products placed in the lanes.

18. The apparatus of claim 15, wherein the flexible members are formed from silicone.

19. A method for preparing food products on a flat griddle, comprising:

placing one or more food products on a griddle surface of the griddle; and placing a cover in a lowered position above the griddle surface, the cover comprising a rigid frame and a plurality of flexible members on the frame and spaced apart from one another such that intermediate regions of the flexible members conform to shapes of the food products to apply pressure to the food products, wherein each flexible member comprises a strip including opposite ends fixed to the frame and a curved intermediate region extending between the opposite ends.

20. The method of claim 19, wherein the flexible members are arranged in a plurality of rows located above respective lanes of the griddle surface in the lowered position to simultaneously apply pressure to the food products placed in rows along the lanes.

* * * * *